United States Patent
Herman et al.

(10) Patent No.: US 11,972,015 B2
(45) Date of Patent: Apr. 30, 2024

(54) PERSONALLY IDENTIFIABLE INFORMATION REMOVAL BASED ON PRIVATE AREA LOGIC

(71) Applicant: FORD GLOBAL TECHNOLOGIES, LLC, Dearborn, MI (US)

(72) Inventors: David Michael Herman, West Bloomfield, MI (US); Gregg William Byrne, Dearborn, MI (US); Akshay Vaidya, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 422 days.

(21) Appl. No.: 17/335,920

(22) Filed: Jun. 1, 2021

(65) Prior Publication Data
US 2022/0382903 A1 Dec. 1, 2022

(51) Int. Cl.
| | | |
|---|---|---|
| G06F 21/62 | (2013.01) | |
| G06K 9/72 | (2006.01) | |
| G06T 15/20 | (2011.01) | |
| G06V 30/262 | (2022.01) | |
| G06N 5/04 | (2023.01) | |

(52) U.S. Cl.
CPC ........ *G06F 21/6245* (2013.01); *G06T 15/205* (2013.01); *G06V 30/274* (2022.01); *G06N 5/04* (2013.01)

(58) Field of Classification Search
CPC . G06F 21/6245; G06V 30/274; G06T 15/205; G06N 5/04
See application file for complete search history.

(56) References Cited

U.S. PATENT DOCUMENTS

| | | | |
|---|---|---|---|
| 9,807,061 B2 | 10/2017 | Hughes et al. | |
| 9,858,699 B2 | 1/2018 | Gordon et al. | |
| 9,959,397 B1 | 5/2018 | Kvamme et al. | |
| 10,776,892 B2* | 9/2020 | Kreitzer | H04W 12/02 |
| 10,839,104 B2 | 11/2020 | Balzer et al. | |
| 10,909,392 B1* | 2/2021 | Chaudhuri | G06V 20/647 |
| 11,677,568 B2* | 6/2023 | Ryu | B60R 11/00 |
| | | | 713/156 |
| 2007/0122108 A1 | 5/2007 | Bontempi | |
| 2017/0177904 A1 | 6/2017 | Bilodeau et al. | |
| 2019/0050592 A1* | 2/2019 | Grau | G06F 21/629 |
| 2019/0317507 A1* | 10/2019 | Zhang | G05D 1/0214 |
| 2020/0026877 A1* | 1/2020 | Dattatri | G06F 21/6254 |
| 2021/0004486 A1* | 1/2021 | Adams | G06F 21/604 |
| 2021/0073412 A1* | 3/2021 | Kvochko | G06T 1/0021 |
| 2022/0050473 A1* | 2/2022 | Pärnpuu | B25J 13/003 |

* cited by examiner

*Primary Examiner* — Kambiz Zand
*Assistant Examiner* — Afaq Ali
(74) *Attorney, Agent, or Firm* — Frank Lollo; Brooks Kushman P.C.

(57) ABSTRACT

Removal of PII is provided. Sensor data is captured using sensors of a vehicle. Object detection is performed on the sensor data to create a sematic labeling of objects in the sensor data. A model is utilized to classify regions of the sensor data with a public or private labeling according to the sematic labeling and a PII filter corresponding to a jurisdiction of a current location of the vehicle. The sensor data is utilized in accordance with the public or private labeling.

14 Claims, 5 Drawing Sheets

PERSONALLY IDENTIFIABLE INFORMATION REMOVAL BASED ON PRIVATE AREA LOGIC

TECHNICAL FIELD

Aspects of the disclosure generally relate to removal of personally identifiable information (PII) from sensor data using private area logic.

BACKGROUND

PII includes many forms of information that could identify or trace a human being or member of a household. PII may include textual information such as names, addresses, and birth dates. PII may include other information as well, such as photographs of people, house addresses, vehicle license plates, or biometrics. Data analytics may require the use of large sets of collected data. These data sets may include PII.

SUMMARY

In one or more illustrative examples, a vehicle for removal of PII is provided. Sensors of the vehicle are configured to capture sensor data. One or more controllers of the vehicle programmed to perform object detection on the sensor data to create a sematic labeling of objects in the sensor data, utilize a model to classify regions of the sensor data with a public or private labeling according to the sematic labeling and a PII filter corresponding to a jurisdiction of a current location of the vehicle, and utilize the sensor data in accordance with the public or private labeling.

In one or more illustrative examples, a method for removal of PII is provided. Sensor data is captured using sensors of a vehicle. Object detection is performed on the sensor data to create a sematic labeling of objects in the sensor data. A model is utilized to classify regions of the sensor data with a public or private labeling according to the sematic labeling and a PII filter corresponding to a jurisdiction of a current location of the vehicle. The sensor data is utilized in accordance with the public or private labeling.

In one or more illustrate examples, a non-transitory computer-readable medium includes instructions for removal of PII that, when executed by one or more controllers of a vehicle, cause the vehicle to capture sensor data using sensors of the vehicle; perform object detection on the sensor data to create a sematic labeling of objects in the sensor data; utilize a model to classify regions of the sensor data with a public or private labeling according to the sematic labeling and a PII filter corresponding to a jurisdiction of a current location of the vehicle; and utilize the sensor data in accordance with the public or private labeling.

DETAILED DESCRIPTION

Figure 1:
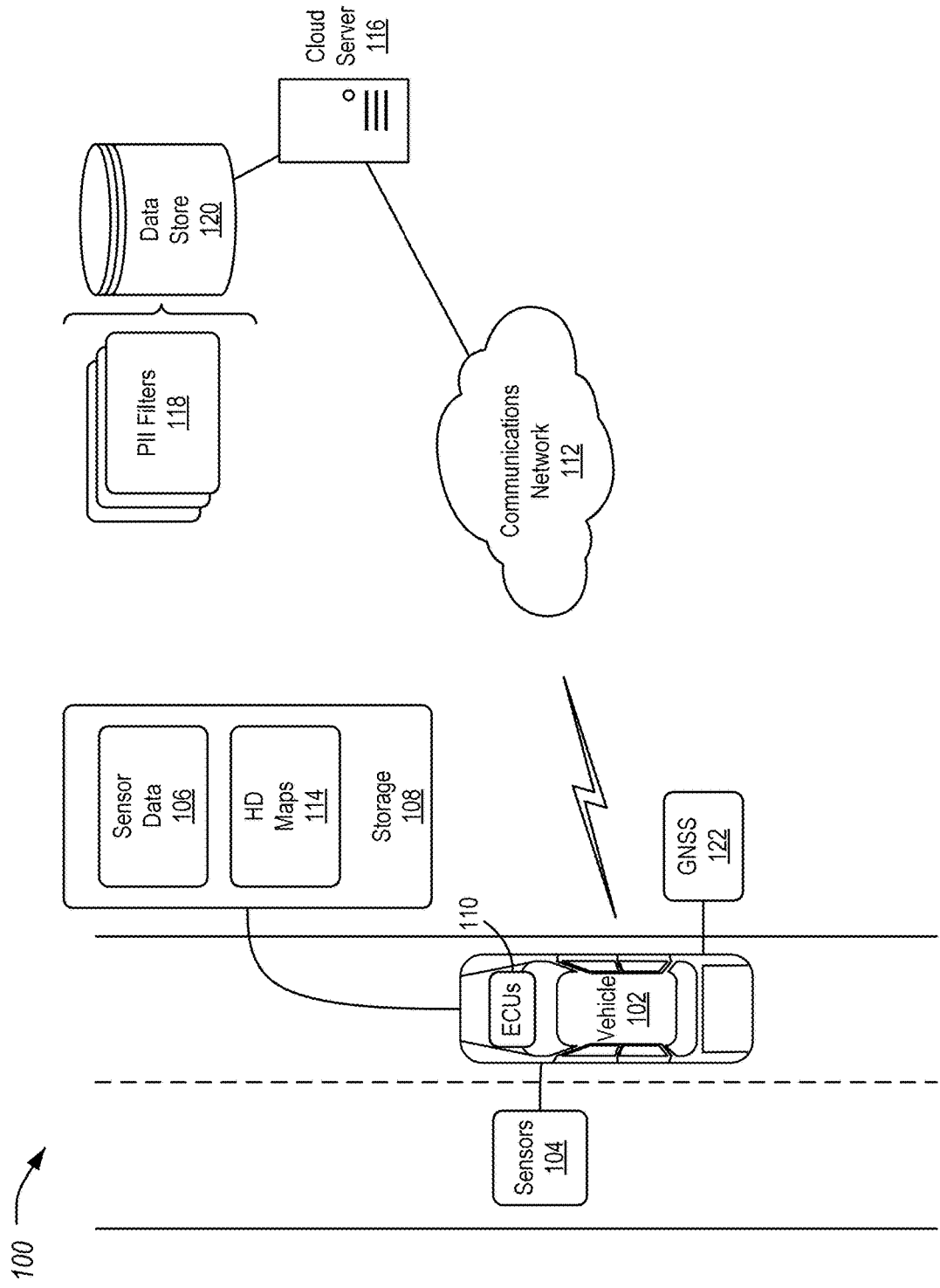
FIG. 1 illustrates an example system for the removal of PII based on private area logic.

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Vehicle manufacturers are increasingly adding connected features (e.g., a sentry mode or vehicle watch mode where the vehicle captures data about its surroundings, etc.) which provide some value to customer but may also inadvertently capture sensitive and/or personal information. These features may capture data in locations that may be expected to be private such as on private property or in a secluded area. For instance, sensor data may capture image data looking into a personal residence or on a private property, where depending on the data privacy laws of the jurisdiction, the definition of private property or non-publicly accessible property may vary. Further, image data may consist of both public and private image data (e.g. regions or subset of pixels) which may vary based on the position of the vehicle and the respective position of static objects and/or mobile actors. Some actors may be captured in the scene that are simply passing pedestrians of limited importance, others may cause issues to vehicle and be of greater importance. Some countries may also have specific laws prohibiting image capture of protected classes such as police or military facilities. Some countries have severe restrictions on the use (both public and private) of video recordings (e.g., public disclosure on social media).

Yet, a customer may expect that the capture features would provide functionality on their own private residence or within the immediate area near their vehicle, e.g., on public street. Thus, it may be desirable to intelligently separate allowable and prohibited data collection from a vehicle sensor. However, such functionality may create liability for the vehicle manufacturer depending on the data captured and the local data privacy laws and/or customer annoyance.

The present disclosure provides an approach to remove, deidentify, or anonymize sensor data (e.g., camera images) in accordance with the data privacy laws of the jurisdiction in which the vehicle is located. The image data may be filtered to remove or anonymize private data while retaining image data from publicly accessible regions of the image. The described approach for mitigating concerns of private location image data may vary based on object type and local privacy laws. Further aspects of the disclosure are discussed in detail herein, but it should be noted that other methods, approaches, and variations are contemplated.

FIG. 1 illustrates an example system 100 for the removal of PII based on private area logic. In such a system, a vehicle 102 may utilize one or more sensors 104 to capture sensor data 106 including PII and non-PII. The vehicle 102 may include a storage 108 configured to maintain the sensor data 106. The vehicle 102 may also include an electronic control unit (ECU) 110 configured to communicate over a communications network 112 with a cloud server 116. The cloud server 116 may maintain PII filters 118 in a data store 120 that may be used to selectively filter the sensor data 106. It should be noted that the system 100 is an example, and systems 100 having more, fewer, or different elements may be used. For instance, while one vehicle 102 is shown, it is contemplated that systems 100 could include many vehicles 102. As another example, while a single cloud server 116 is shown, it should be noted that implementations may include more than one server, for load balancing or other networking purposes.

The vehicle 102 may include various types of automobile, crossover utility vehicle (CUV), sport utility vehicle (SUV), truck, jeepney, recreational vehicle (RV), boat, plane, or other mobile machine for transporting people or goods. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle powered by both an internal combustion engine and one or more electric motors, such as a series hybrid electric vehicle, a parallel hybrid electrical vehicle, or a parallel/series hybrid electric vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The sensors 104 may include various devices configured to capture sensor data 106 of the vehicle 102 environment. In an example, the sensors 104 may include visible light cameras or infrared cameras configured to capture still images and/or video data. In another example, the sensors 104 may include sensors configured to determine three-dimensional (3D) information, such as radar sensors or lidar sensors. In yet a further example, the sensors 104 may include sound sensors such as microphones that may pick up voice commands of a user and also background conversation. The sensor data 106 may be stored to a database, memory, or other storage 108 of the vehicle 102.

The sensors 104 may be configured to capture sensor data 106 of the surroundings of the vehicle 102. For instance, the sensors 104 may be configured to generate sensor data 106 of the roadway, of other vehicles 102, of pedestrians, or of obstacles. This sensor data 106 may be useful for driver assistance system, for autonomous driving systems, for a security camera device, for dash camera applications, and/or for recording driving data for recreation (e.g., track days). However, the capture of such sensor data 106 may involve the capture of PII. For instance, license plates of other vehicles may be captured in the sensor data 106. Faces of pedestrians, workers, police, and other people may be captured in the sensor data 106 as another example. Private property, such as the interiors of buildings may also be captured by the sensor data 106. Other areas where there is a reasonable expectation of privacy may also be captured by the sensor data 106.

The ECUs 110 may include one or more controllers configured to provide services to the vehicle 102. These services may include, as some non-limiting possibilities, connected services such as navigation, turn-by-turn directions, vehicle health reports, local business search, accident reporting, and hands-free calling. The ECUs 110 may accordingly be configured to utilize a transceiver to communicate with a communications network 112.

As another example, these services may include advanced driver assist system (ADAS) services such as autonomous braking, adaptive cruise control, lane keeping assistance, etc. These services may, in some examples, require the use of sensor data 106 from the sensors 104. The vehicle 102 may also maintain high definition (HD) maps 114 in support of the ADAS services. These HD maps 114 may, for example, provide for centimeter-level accurate representations of roadway features attributed with information such as lanes, traffic signs, and lane geometry.

The communications network 112 may provide communications services, such as packet-switched network services (e.g., Internet access, voice over Internet Protocol (VoIP) communication services), to devices connected to the communications network 112. An example of a communications network 112 is a cellular telephone network. For instance, the ECU 110 may access the cellular network via connection to one or more cellular towers. To facilitate the communications over the communications network 112, the ECU 110 may be associated with unique device identifiers (e.g., mobile device numbers (MDNs), Internet protocol (IP) addresses, etc.) to identify the communications of the ECU 110 on the communications network 112 as being associated with the vehicle 102.

The cloud server 116 may be a computing device configured to communicate with the vehicles 102 over the communications network 112. The cloud server 116 may be configured to provide PII filters 118 to the vehicles 102 based on the location of the vehicle 102. For instance, a vehicle 102 may determine its location, and may send that location to the cloud server 116, which in turn may return a PII filter 118 for the location back to the vehicle 102. In some examples, the vehicle 102 may be configured to cache PII filters 118 for likely use, e.g., in the storage 108 of the vehicle 102. Each PII filter 118 may be configured to implement the filtering of sensor data 106 in accordance with the laws of a different jurisdiction. This filtering may account for factors such as allowability to record private property visible from public property, allowability of image capture of faces of protected classes of people such as police, military bases, religious institutions, etc., allowability of image capture of biometric information, etc.

The vehicle 102 may also include a global navigation satellite system (GNSS) controller 122 configured to provide geolocation services to the vehicle 102. In an example, the vehicle 102 may utilize the GNSS controller 122 to determine which of the PII filters 118 applies for the current location of the vehicle 102.

Figure 2:
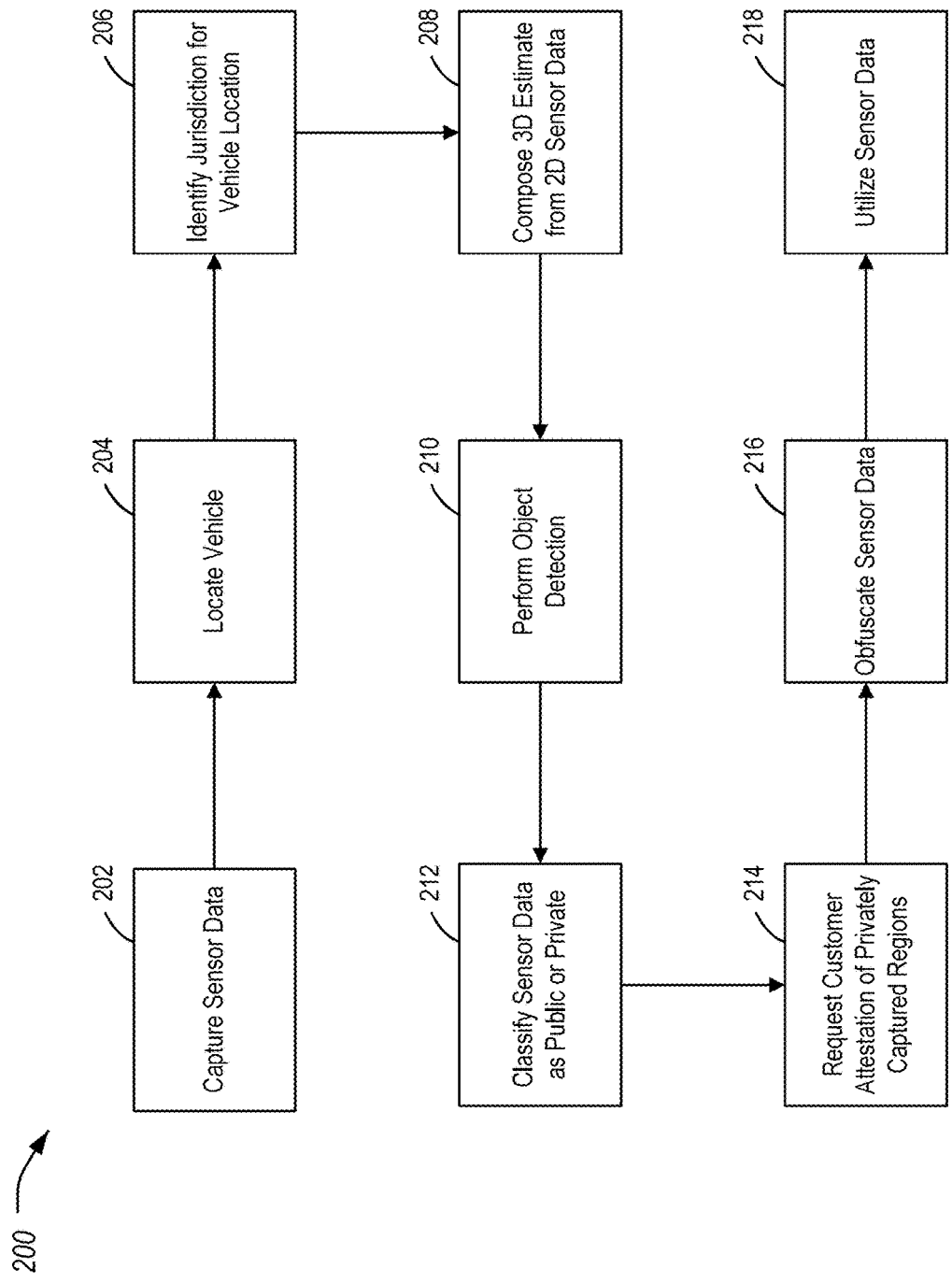
FIG. 2 illustrates an example process for the removal of PII based on the private area logic that may be performed using the system of FIG. 1.

FIG. 2 illustrates an example process 200 for the removal of PII based on private area logic. In an example, the process 200 may be performed by the vehicle 102 in the context of the system 100 described above. It should be noted that for systems such ADAS features, in many cases such systems may capture sensor data 106 without waiting for the process 200 to be completed. However, the process 200 may be useful for the processing of data before the data is put at rest.

At operation 202, the vehicle 102 captures sensor data 106. In an example, the capture of the sensor data 106 may be performed by the vehicle 102 responsive to a user request (e.g., a request to see the surroundings of the vehicle 102, activation of vehicle watch mode, remote streaming of surround view camera of the vehicle 102 through a cloud system to the user's mobile device, etc.). In another example, the capture of the sensor data 106 may be performed by the vehicle 102 automatically responsive to occurrence of a predefined condition, such as a detection by the vehicle 102 of an approaching individual, occurrence of a loud noise or vibration, etc.

Figure 3:
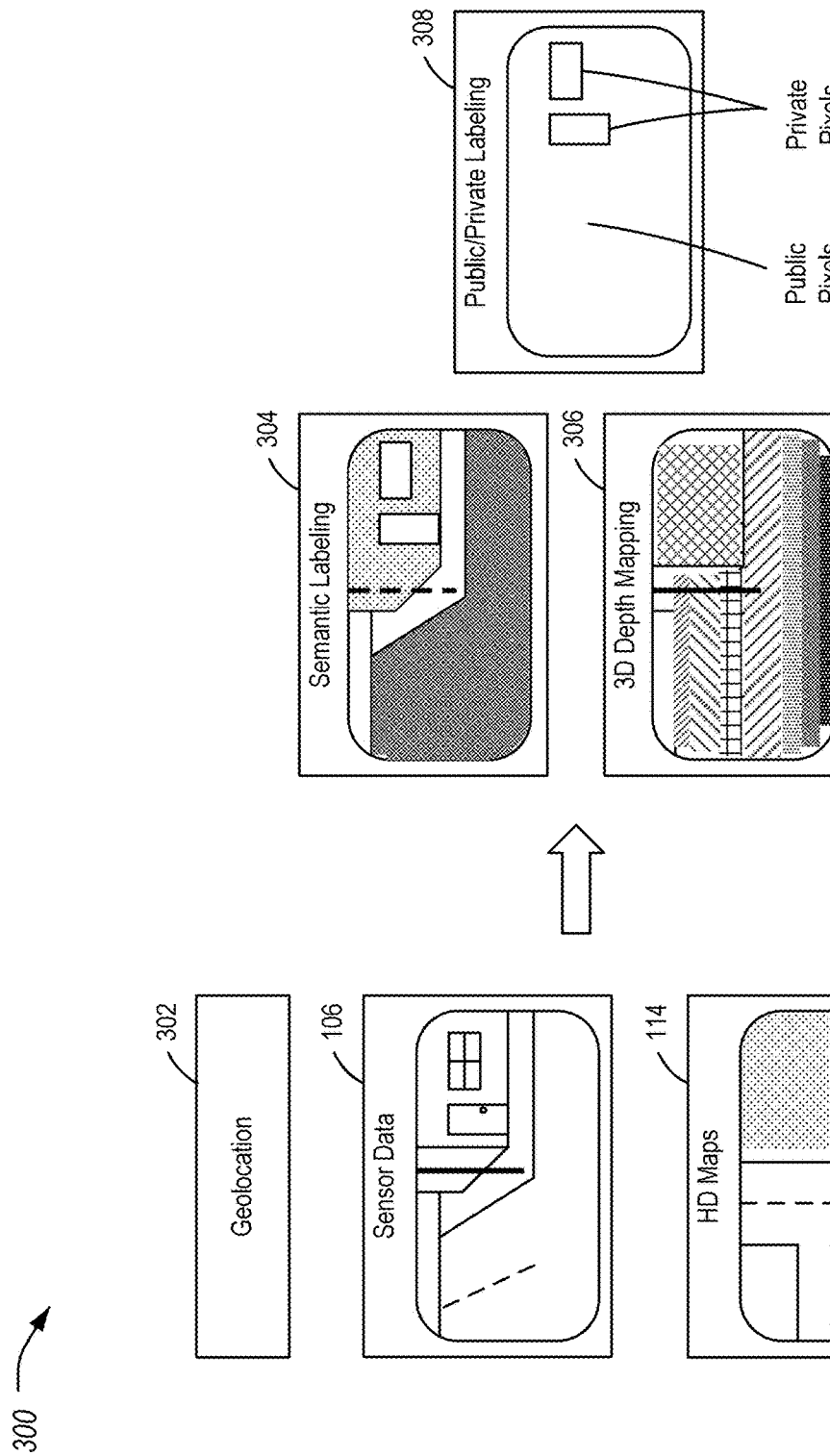
FIG. 3 illustrates an example data flow with respect to the operation of the process of FIG. 2.

FIG. 3 illustrates an example data flow 300 with respect to the operation of the process 200. Referring to FIG. 3, and with continued reference to FIG. 2, an example of captured sensor data 106 is shown. In the sensor data 106, an image is captured of a building along a roadway.

At operation 204, the vehicle 102 performs a geolocation 302. In an example, the vehicle 102 uses the GNSS controller 122 to determine the current location of the vehicle 102. Additionally or alternately, additional localization techniques may be performed. For instance, aspects of the vehicle 102 location may be determined based on sensor information, such as identification of landmarks in image data. In another example, vehicle 102 pose (e.g., orientation, inclination, elevation etc.) may be determined based on sensor data 106 from sensors 104 such as cameras, accelerometers, the GNSS controller 122, etc. In yet a further example, the vehicle 102 may incorporate use of the HD maps 114 to cross-reference sensor data 106 and thus improve localization.

At operation 206, the vehicle 102 identifies the jurisdiction of the vehicle 102 according to the geolocation 302. By identifying the jurisdiction, the vehicle 102 may be able to identify the data privacy law requirements for the vehicle 102 location. Such an approach may be applicable for countries and/or legal entities where individual states may have varying data privacy laws (e.g., the United States, Australia, Germany, the European Union (EU), etc.).

Depending on where the vehicle 102 is intended to be sold, the PII filter 118 may be calibrated into the vehicle 102. The filtering may be performed onboard the vehicle 102 to protect the display, local storage, and/or transmission of data off the vehicle 102. However, if the location determined at operation 204 indicates that the vehicle 102 has moved from one country/jurisdiction to another with different privacy laws that what is calibrated in the vehicle 102, the vehicle 102 may indicate to the user that the vehicle 102 may need to update to a PII filter 118 corresponding to the new location of the vehicle 102. In some examples, user consent may be required to update the PII filter 118, while in other instances, the vehicle 102 may update the PII filter 118 automatically (e.g., due to a change in vehicle location, due to a change in law for the same location, etc.).

If a navigation route is being used by the vehicle 102 to navigate to a destination, and if jurisdictions with different PII policies are identified on-route, the vehicle 102 may be configured to download the PII filters 118 for those locales in advance and switch to the appropriate PII filter 118 responsive to the vehicle 102 entering a different PII jurisdiction.

At operation 208, the vehicle 102 converts two-dimensional (2D) sensor data 106 into a 3D estimate of the sensor data 106. This may be used to generate a 3D depth mapping 306. In an example, the sensor data 106 may be image data, and the 3D estimate may be a point cloud. In an example, the ECUs 110 may use structure from motion, monocular depth estimation, stereo depth estimation, sensor fusion, etc. to convert the 2D image embodied by the sensor data 106 into the 3D estimate for pixels or pixel regions (e.g., stixels). It should be noted that some sensors 104, such as LiDAR or RADAR sensors 104, may produce depth or point cloud data. This data may be referenced to a global coordinate space relative to the sensor location on the vehicle 102 and the location of the vehicle 102.

Figure 4:
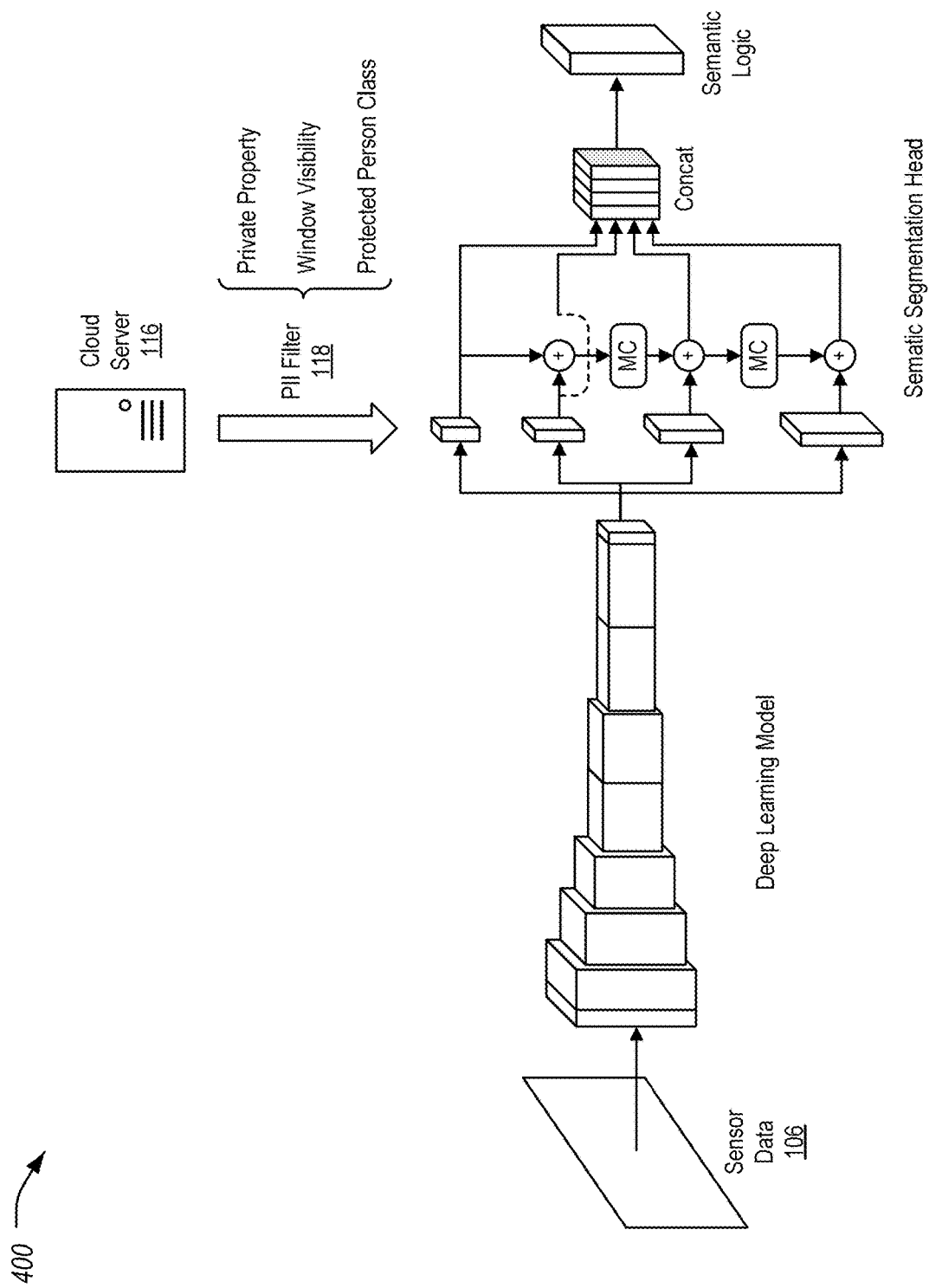
FIG. 4 illustrates a modular deep learning inference model to perform semantic segmentation as well as PII filtering with country specific characteristics.

At operation 210, the vehicle 102 perform object detection. Referring more specifically to FIG. 4, the ECU 110 may utilize a modular deep learning inference model 400 to perform semantic segmentation as well as PII filtering with country specific characteristics. The output of the semantic segmentation may be a sematic labeling 304 indicating the different elements in the sensor data 106. Semantic segmentation refers to a pixel level image classification in which pixels of the image sensor data 106 are clustered together into one of a set of class labels. These labels could include, for example, vehicle 102, human, building, roadway, tree, traffic control, etc. The semantic segmentation may receive the input image sensor data 106. Using the input, the model may perform a mapping of pixels of the input image sensor data 106 to categories. In an example, the model for performing the semantic segmentation may be a deep convolutional neural network. In some examples, the segmentation may be performed per frame. In other examples, the segmentation may be performed across frames, such as to identify motion (e.g., in the interior of a building) over several image frames.

At operation 212, the vehicle 102 performs a data fusion. In an example, the vehicle 102 fuses the 3D estimate, the object detection, and the HD maps 114 to classify sensor data 106 units as publicly or privately accessible. The result of this fusion may be a public-private labeling 308 of the pixels of the image sensor data 106. For example, the model 400 may recognize a building exterior of a given depth from the vehicle 102 in the sensor data 106. Additionally, the model 400 detection may detect individual windows where the vehicle 102 may look into. As some other examples, government buildings or defense facilities may be identified as being privately accessible, while other buildings may be identified as being publicly accessible. Variations on the data fusion are possible. In an alternate example, a neural network may be used to identify pixels as publicly or privately accessible based on a training for different types of public and private image data, without use of the HD maps 114 in the data fusion. It should also be noted that the HD maps 114 may be of a different perspective than the sensor data 106, so vehicle pose, orientation, location, etc. may be used to map the HD map 114 data and the image sensor data 106 into a common coordinate system for processing.

Based on the semantic segmentation, and the PII filters 118, the ECU 110 may determine whether there are regions of the sensor data 106 that involve PII. Due to rules in a first jurisdiction, one of the PII filters 118 may deem window regions and door regions to involve PII as such regions may include the interior of buildings which is not in the public view. In another example, due to rules in a second jurisdiction, a different PII filter 118 may deem those regions not to involve PII. One identified as PII or non-PII according to the PII filter 118 in use, the ECU 110 may classify the pixels of the sensor data 106 as either PII or non-PII. In another example, the ECU 110 may utilize the HD maps 114 to identify regions of private property. Using the rules of the active PII filter 118, those regions of private property may also be classified as involving PII. In yet a further example, the faces of public actors of a protected class such as police or clowns may be flagged as involving PII.

At operation 214, the vehicle 102 requests customer attestation of the identified privately captured region. In an example, the vehicle 102 may request for the user to either accept the obfuscation of the sensor data 106 or provide attestation that the data will not be misused and that all captured data subjects provided consent. For example, the customer may attest that the vehicle 102 is stored on the owner's private property owned by the customer and/or that the user has a reasonable request to access the unobfuscated sensor data 106.

At operation 216, the vehicle 102 obfuscates the sensor data 106. In an example, for those regions having PII and no attenuation, the vehicle 102 may perform operations including one or more of to remove, de-identify, blur, or otherwise anonymize the respective pixels regions identified as being PII. In one example, the vehicle 102 may superimpose a static image over the private areas of the image frames. In another example, the vehicle 102 may blur the PII regions of the image frames. In yet another example, the video blurring process may be reversible, and for example may utilize encryption to store a secured copy of the PII information to allow later unlocking upon a request or authorization. In yet a further example, if the sensor data 106 includes, for example, gait information, the obfuscation could include silencing or changing the gait information (e.g., if the gait is captured in audio, the audio could be muted or altered).

Accordingly, this filtering may prevent use of the image sensor data 106 for purposes in contravention of local PII rules. For instance, the sensor data 106 may be filtered before being provided to the cloud server 116. In another example, local laws may allow live display but not storage. In yet a further example, storage to the local storage 108 of raw sensor data 106 may be allowed but storage on the cloud server 116 may require the obfuscation of the sensor data 106.

At operation 218, the vehicle 102 utilizes the sensor data 106. This may include, as some examples, to transmit the sensor data 106, to save the sensor data 106 to the storage 108, to save the sensor data 106 to the cloud server 116, or to display the sensor data 106 to the user.

Figure 5:
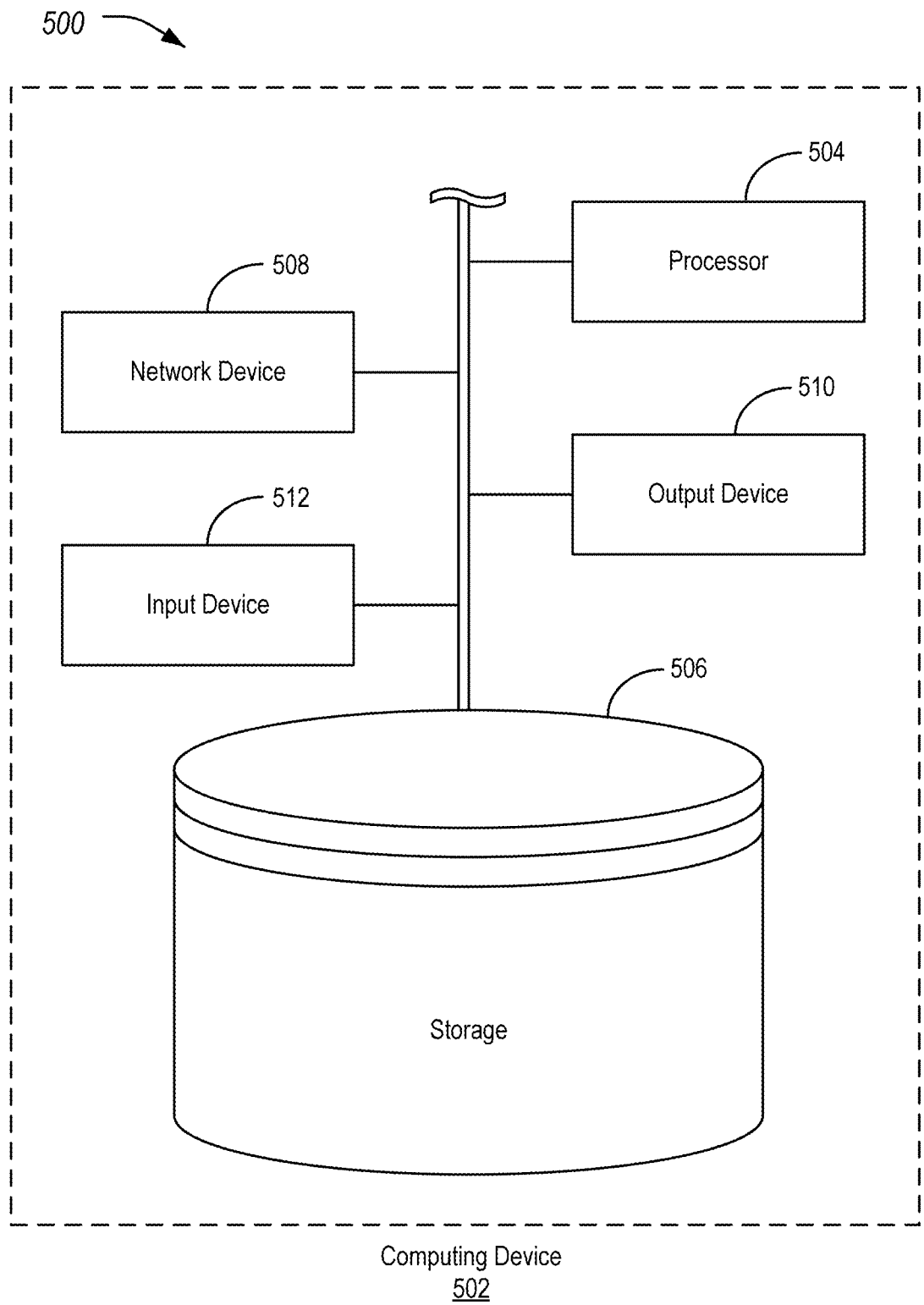
FIG. 5 illustrates an example computing device for the removal of PII based on private area logic.

FIG. 5 illustrates an example computing device 500 for the removal of PII based on private area logic. The algorithms and/or methodologies performed by the sensors 104, ECUs 110, cloud server 116, and GNSS controller 122 may be implemented using such computing devices 500. The computing device 500 may include a memory 502, a processor 504, non-volatile storage 506, a network device 508 (e.g., a cellular transceiver, etc.), an output device 510 (e.g., a human machine interface (HMI) screen, a speaker, the network device 508, etc.), and an input device 512 (e.g., the HMI screen, a microphone, the network device 508, etc.). The processor 504 may include one or more devices selected from high-performance computing (HPC) systems including high-performance cores, microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 502. The memory 502 may include a single memory device or a number of memory devices including, but not limited to, random access memory (RAM), volatile memory, non-volatile memory, static random-access memory (SRAM), dynamic random access memory (DRAM), flash memory, cache memory, or any other device capable of storing information. The non-volatile storage 506 may include one or more persistent data storage devices such as a hard drive, optical drive, tape drive, punch cards, non-volatile solid-state device, cloud storage or any other device capable of persistently storing information.

The processor 504 may be configured to read into memory 502 and execute computer-executable instructions residing in the non-volatile storage 506 and embodying algorithms and/or methodologies of one or more embodiments. The program instructions may include operating systems and applications. The program instructions may be compiled or interpreted from computer programs created using a variety of programming languages and/or technologies.

Upon execution by the processor 504, the computer-executable instructions may cause the computing device 500 to implement one or more of the algorithms and/or methodologies disclosed herein. The non-volatile storage 506 may also include data supporting the functions, features, and processes of the one or more embodiments described herein. This data may include, as some examples, the sensor data 106, the HD maps 114, the PII filters 118, the geolocation 302, the sematic labeling 304, the 3D depth mapping 306, the public-private labeling 308, and the deep learning model 400.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes wherein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure.

Additionally, the features of various implementing embodiments may be combined to form further embodiments of the disclosure.

What is claimed is:

1. A system for removal of personally identifiable information (PII), comprising:
sensors configured to capture sensor data; and
one or more controllers programmed to
perform object detection on the sensor data to create a sematic labeling of objects in the sensor data,
identify a current location of the system,
create a three-dimensional (3D) depth mapping based on the sensor data,
perform a data fusion to fuse the 3D depth mapping, the object detection, and high definition (HD) maps of the current location,
utilize a model receiving the data fusion as input to classify regions of the sensor data with a public or private labeling according to the sematic labeling, the 3D depth mapping, the HD maps, and a PII filter corresponding to a jurisdiction of the current location of the system, and
utilize the sensor data in accordance with the public or private labeling.

2. The system of claim 1, wherein the one or more controllers are further programmed to obfuscate the regions of the sensor data labeled as private in the public or private labeling.

3. The system of claim 1, wherein the one or more controllers are further programmed to:
request customer attestation of the regions of the sensor data indicated as being private according to the public or private labeling; and
obfuscate the regions of the sensor data labeled as private in the public or private labeling, for which the customer attestation is not received.

4. The system of claim 1, wherein the sensors include image sensors, the sensor data is image data, and the regions of the sensor data include pixels of the image data.

5. The system of claim 1, further comprising a transceiver, wherein the one or more controllers are further programmed to:
utilize the transceiver to download the PII filter corresponding to the jurisdiction.

6. A method for removal of personally identifiable information (PII), comprising:
capturing sensor data using sensors of a vehicle;
performing object detection on the sensor data to create a sematic labeling of objects in the sensor data;
identifying a current location of the vehicle;
creating a three-dimensional (3D) depth mapping based on the sensor data;
performing a data fusion to fuse the 3D depth mapping, the object detection, and high definition (HD) maps of the current location;
utilizing a model receiving the data fusion as input to classify regions of the sensor data with a public or private labeling according to the sematic labeling, the 3D depth mapping, the HD maps, and a PII filter corresponding to a jurisdiction of the current location of the vehicle; and
utilizing the sensor data in accordance with the public or private labeling.

7. The method of claim 6, further comprising obfuscating the regions of the sensor data labeled as private in the public or private labeling.

8. The method of claim 6, further comprising:
requesting customer attestation of the regions of the sensor data indicated as being private according to the public or private labeling; and
obfuscating the regions of the sensor data labeled as private in the public or private labeling, for which the customer attestation is not received.

9. The method of claim 6, wherein the sensors include image sensors, the sensor data is image data, and the regions of the sensor data include pixels of the image data.

10. The method of claim 6, further comprising:
utilizing a transceiver of to download the PII filter corresponding to the jurisdiction.

11. A non-transitory computer-readable medium comprising instructions for removal of personally identifiable information (PII) that, when executed by one or more controllers of a vehicle, cause the vehicle to:
capture sensor data using sensors of the vehicle;
perform object detection on the sensor data to create a sematic labeling of objects in the sensor data;
identify a current location of the vehicle;
create a three-dimensional (3D) depth mapping based on the sensor data;
perform a data fusion to fuse the 3D depth mapping, the object detection, and high definition (HD) maps of the current location;
utilize a model receiving the data fusion as input to classify regions of the sensor data with a public or private labeling according to the sematic labeling, the 3D depth mapping, the HD maps, and a PII filter corresponding to a jurisdiction of the current location of the vehicle; and
utilize the sensor data in accordance with the public or private labeling.

12. The medium of claim 11, further comprising instructions that, when executed by the one or more controllers of the vehicle, cause the vehicle to one or more of:
obfuscate the regions of the sensor data labeled as private in the public or private labeling, or
obfuscate the regions of the sensor data labeled as private in the public or private labeling, for which customer attestation is not received.

13. The medium of claim 11, wherein the sensors include image sensors, the sensor data is image data, and the regions of the sensor data include pixels of the image data.

14. The medium of claim 11, further comprising instructions that, when executed by the one or more controllers of the vehicle, cause the vehicle to:
utilize a transceiver to download the PII filter corresponding to the jurisdiction.

* * * * *